United States Patent [19]

Miller et al.

[11] Patent Number: 5,136,163
[45] Date of Patent: * Aug. 4, 1992

[54] METHOD FOR DETECTING RADIATION DOSE UTILIZING THERMOLUMINESCENT MATERIAL

[75] Inventors: Steven D. Miller, Richland; Joseph C. McDonald, Pasco; Fred N. Eichner, Kennewick; James S. Durham, Richland, all of Wash.

[73] Assignee: Battelle Memorial Institute, Richland, Wash.

[ * ] Notice: The portion of the term of this patent subsequent to Jun. 18, 2008 has been disclaimed.

[21] Appl. No.: 689,701

[22] Filed: Apr. 17, 1991

Related U.S. Application Data

[63] Continuation-in-part of Ser. No. 420,293, Oct. 11, 1989, Pat. No. 5,025,159, which is a continuation-in-part of Ser. No. 213,245, Jun. 29, 1988, Pat. No. 4,954,707.

[51] Int. Cl.$^5$ .............................................. G01T 1/115
[52] U.S. Cl. .................................. 250/337; 250/484.1
[58] Field of Search .......... 250/337, 484.1 A, 484.1 C

[56] References Cited

U.S. PATENT DOCUMENTS 3,924,135 12/1975 Dhar et al. ........................... 250/337
3,959,658 5/1976 Ziemer et al. ................ 250/484.1 A Primary Examiner—Janice A. Howell
Assistant Examiner—Richard Hanig
Attorney, Agent, or Firm—Dellett, Smith-Hill and Bedell

[57] ABSTRACT

The amount of ionizing radiation to which a thermoluminescent material has been exposed is determined by first cooling the thermoluminescent material and then optically stimulating the thermoluminescent material by exposure to light. Visible light emitted by the thermoluminescent material as it is allowed to warm up to room temperature is detected and counted. The thermoluminescent material may be annealed by exposure to ultraviolet light.

17 Claims, 3 Drawing Sheets

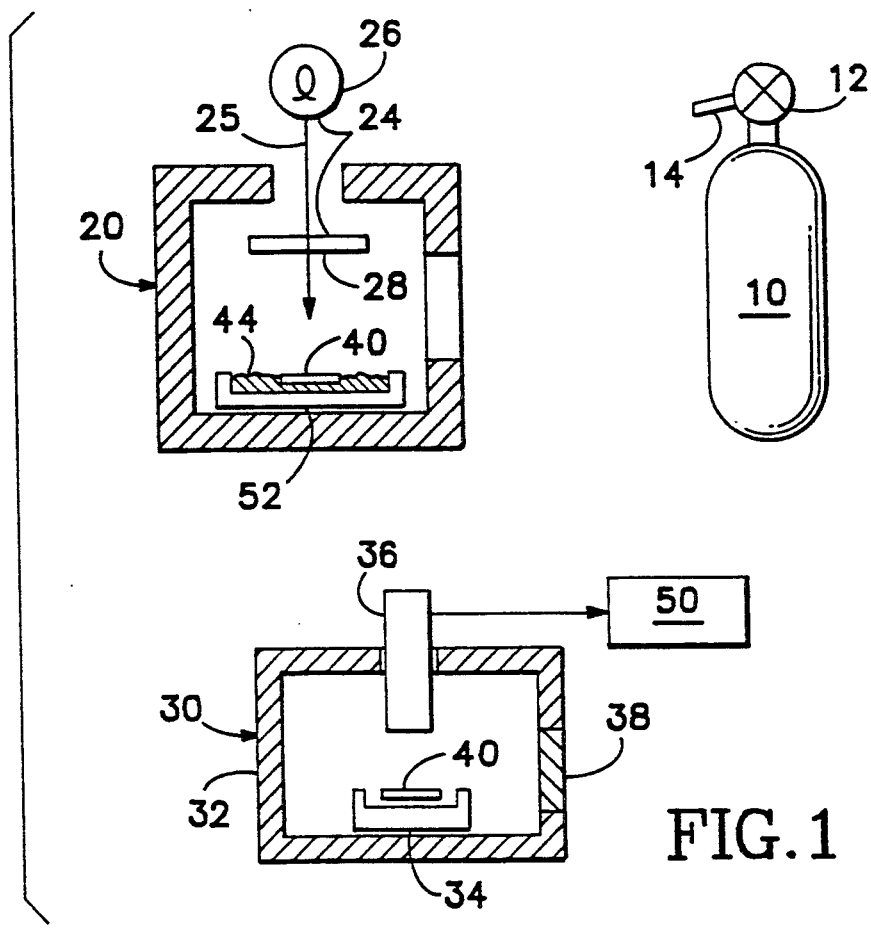
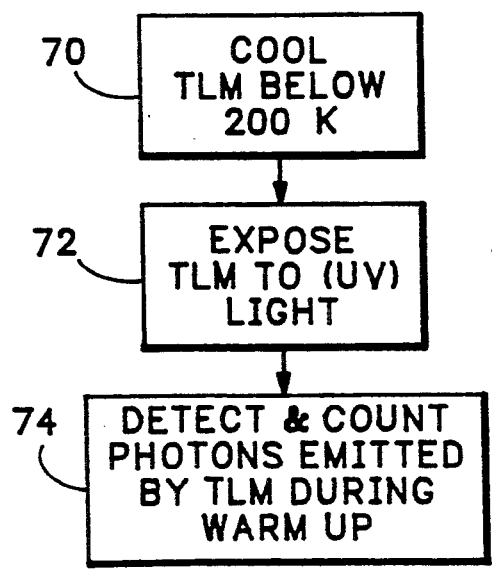

METHOD FOR DETECTING RADIATION DOSE UTILIZING THERMOLUMINESCENT MATERIAL

REFERENCE TO GOVERNMENT CONTRACT

This invention was made with government support under Contract DE-AC06-76RLO 1830, awarded by the U.S. Department of Energy. The government has certain rights in the invention.

CROSS-REFERENCE TO RELATED APPLICATION

This is a continuation-in-part of copending U.S. patent application Ser. No. 07/420,293 filed Oct. 11, 1989, now U.S. Pat. No. 5,025,155 issued Jun. 18, 1991, which was filed as a continuation-in-part of U.S. patent application Ser. No. 07/213,245 filed Jun. 29, 1988, now U.S. Pat. No. 4,954,707 issued Sep. 4, 1990.

BACKGROUND OF THE INVENTION

The present invention relates to radiation detection technology and more specifically to dosimeters that utilize thermoluminescent materials to measure radiation dosage.

Dosimeters that utilize thermoluminescent materials have been in widescale use for many years. The thermoluminescent materials employed in these devices are crystalline compounds that contain impurities and structural imperfections of various sorts such as missing atoms or ions and regions of misregistry between the planes of their crystal lattices. Some of these imperfections have the ability to capture or "trap" charge carriers in excited states of the type generated by exposure to ionizing radiation, such as gamma or beta radiation. The strength with which the charge carriers are bound by such traps depends upon the nature of the trap and its depth.

Traps are usually characterized by their thermal energy, that is, the temperature to which the thermoluminescent material must be heated in order to ensure release of the charges held by the traps. When these charges are released luminescence commonly occurs. The light quanta emitted may be photometrically detected and related to radiation exposure. Therefore, dosimeters containing thermoluminescent materials are conventionally read out by heating to about 533 K while the intensity of the light emitted by the material is recorded in the form of a "glow curve", the size of which is representative of the amount of ionizing radiation absorbed by the dosimeter.

The above-described procedures (commonly referred to as "TLD" techniques) may be perceived to have a number of important drawbacks. Only traps of intermediate energy between about 470 K and 570 K can be read out, since at temperatures above this range substantial amounts of thermal quenching occur due to non-luminescence producing transitions whereby quantum efficiencies are significantly lowered. Consequently, the information represented by a large number of high energy traps is totally ignored. Further, the incandescent radiation produced by the thermoluminescent material at temperatures above about 570 K raises the level of background noise thereby lowering the signal quality.

U.S. Pat. No. 4,954,707, the disclosure of which is hereby incorporated by reference herein, discloses a method for measuring radiation dose by use of thermoluminescent material that does not require heating of the thermoluminescent material above normal room temperature, which is about 293 K. In accordance with the method described in U.S. Pat. No. 4,954,707, the thermoluminescent material is cooled to a temperature below 200 K and is exposed to light radiation, whereby high temperature traps are converted into low temperature traps. The thermoluminescent material is allowed to warm, and the light released by the thermoluminescent material as the charge carriers are released by the low temperature traps is detected.

The thermoluminescent materials described in U.S. Pat. No. 4,954,707 that have been suitable for use in the method described therein are polycrystalline compounds doped with a metallic element, such as $CaF_2$:Mn.

In addition to the ability to respond to incident radiation in a manner that can subsequently be read out, it is important for realization of a practical dosimeter based on thermoluminescent material that it be possible to erase or anneal the thermoluminescent material after readout, so as to restore it to its original condition and enable reuse of the dosimeter. It is known to anneal $CaF_2$:Mn by heat treatment at 673 K for 15-20 minutes.

U.S. patent application Ser. No. 07/420,293, the disclosure of which is hereby incorporated by reference herein, discloses a method of annealing a thermoluminescent material in order to condition it for measuring a dose of ionizing radiation by the method described in U.S. Pat. No. 4,954,707. In accordance with the method described in U.S. patent application Ser. No. 07/420,293, the thermoluminescent material is annealed by exposing the material to light radiation.

SUMMARY OF THE INVENTION

In accordance with a first aspect of the invention, a method for detecting whether a thermoluminescent material has been exposed to ionizing radiation comprises the steps of cooling the thermoluminescent material down to a temperature substantially below that at which the material exhibits a luminescence response on warming after exposure to light radiation, exposing the thermoluminescent material to light radiation in order to photoconvert high temperature traps to low temperature traps, and detecting light radiation released by the thermoluminescent material as it is allowed to warm.

In accordance with a second aspect of the invention, an apparatus for detecting whether a solid state thermoluminescent dosimeter had been exposed to ionizing radiation comprises cooling means for cooling the dosimeter to a predetermined temperature substantially below that at which the dosimeter provides a luminescence response on warming after exposure to light radiation, illumination means for exposing the dosimeter to light radiation in order to photoconvert high temperature traps into low temperature traps, and means for detecting light emitted by the dosimeter as it is allowed to warm.

In accordance with a third aspect of the invention, a method of detecting exposure to ultraviolet light comprises irradiating a thermoluminescent material with a predetermined dose of ionizing radiation, whereby a radiation signal is recorded in the thermoluminescent material, exposing the thermoluminescent material to ultraviolet radiation, whereby the radiation signal is at least partially removed, and detecting the residual radiation signal.

In accordance with a fourth aspect of the invention, a method for detecting exposure to ionizing radiation comprises cooling a body of material containing anion-defective alpha-Al$_2$O$_3$ to a predetermined temperature, exposing said body to light radiation in order to photoconvert high temperature traps into low temperature traps, and detecting light released by said body as it is allowed to warm.

In accordance with a fifth aspect of the invention, a dosimeter apparatus for detecting exposure to radiation comprises a solid state thermoluminescent dosimeter, cooling means for cooling the dosimeter to a predetermined temperature substantially below that at which the dosimeter provides a luminescence response on warming after exposure to light radiation, illumination means for exposing the dosimeter to light radiation in order to photoconvert high temperature traps into low temperature traps, and means for detecting light emitted by the dosimeter as it is allowed to warm.

The subject matter of the present invention is particularly pointed out and distinctly claimed in the concluding portion of this specification. However, both the organization and method of operation, together with further advantages and objects thereof, may best be understood by reference to the following description taken in connection with the accompanying drawings wherein like reference characters refer to like elements.

BRIEF DESCRIPTION OF THE DRAWINGS

FIG. 1 is a diagrammatic representation of mechanical, electrical and optical components useful in measuring exposure to ionizing radiation or ultraviolet radiation;

FIG. 2 is a flow diagram of the process steps of a method for measuring exposure to ionizing radiation;

DESCRIPTION OF THE PREFERRED EMBODIMENT

Figure 3:
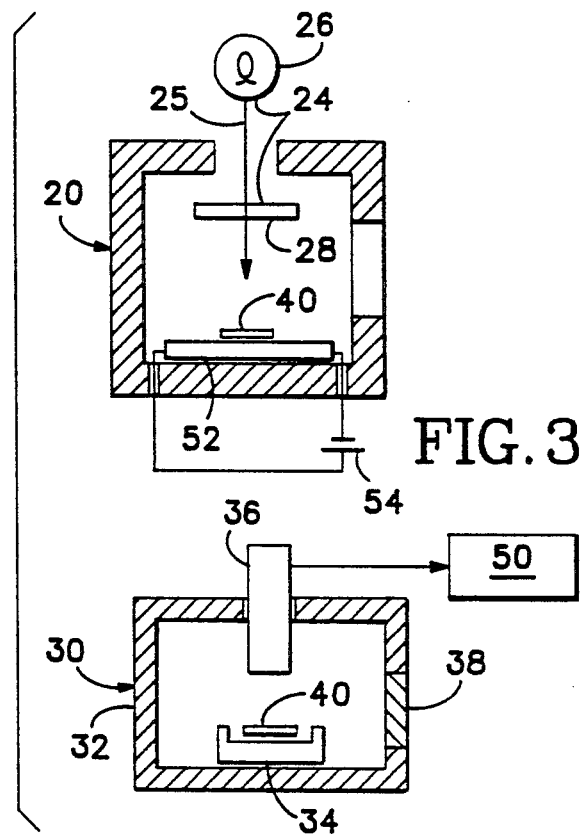
FIG. 3 illustrates a modified form of the apparatus shown in FIG. 1.

FIG. 1 illustrates equipment that may be used for measuring dosages of ionizing radiation and FIG. 2 illustrates the process steps by which the dosages may be measured. Referring now to FIG. 1, the dewar flask 10 functions as a source of liquid nitrogen (77 K) which may be dispensed through the valve 12 and spout 14 as required for cooling to cryogenic temperatures. The sample exposure chamber 20 has walls of a thermally insulating material, such as foamed polystyrene, and is provided with sample holding vessel 22 and a source 24 of ultraviolet light 25, such as a low-pressure mercury lamp 26 and a narrow bandpass filter 28 set to select 254 nm ultraviolet light. The sample readout chamber 30 comprises a light tight enclosure 32 provided with a sample holding tray 34, a photomultiplier tube 36 and a door 38 through which the tray 34 can be accessed.

In operation, the sample holding vessel 22 is filled with liquid nitrogen 44. A sample 40 of a thermoluminescent material (TLM), such as 30 milligrams of CaF$_2$:Mn in a dosimeter, is exposed to ionizing radiation (FIG. 2, step 68) and is then placed in the liquid nitrogen 44 in the vessel 22 and allowed to equilibrate to cryogenic temperatures (FIG. 2, step 70). Thereafter, the sample 40 is exposed to and "optically stimulated" by ultraviolet light (254 nm) from the light source 24 (FIG. 2, step 72). A 30 milligram sample of CaF$_2$:Mn should preferably be exposed to an amount of ultraviolet light equivalent to an amount of energy on the order of several millijoules.

The sample 40 is then removed from the sample exposure chamber 20 and quickly transferred to the sample readout chamber 30. The sample 40 is centered on the sample holding tray 34 and allowed to warm up to ambient temperature (i.e., room temperature or approximately 293 K). The sample holding tray is specially designed to be of sufficient thermal mass and have good heat transfer properties so that the sample 40 will warm up into room temperature range relatively rapidly, such as within 30 to 40 seconds of being placed in the chamber 30. As the sample 40 warms to higher and higher temperatures, the thermoluminescent material emits visible light at wavelengths in the range 494 nm±50 nm. It has been estimated that in the case of CaF$_2$:Mn, visible light is emitted at about 175 K and above. A substantial amount of the emitted light may be detected and amplified by the photomultiplier tube 36 (FIG. 2, step 74). The photomultiplier tube 36 is electrically connected to a recorder and display device 50, which counts the signal information supplied by the photomultiplier 36 and provides a display of the total amount of light released by the sample 40 (FIG. 2, also step 74). This total correlates with the dosage of radiation to which the thermoluminescent material was exposed.

The principles underlying luminescence on warming to ambient temperature, after stimulation with ultraviolet light, involve the solid state physics of the "trapping" centers or sites that exist within thermoluminescent materials. As previously discussed in the background section, it is believed that exposure of a thermoluminescent material to ionizing radiation results in generation of charge carriers in excited states, and these charge carriers can be "trapped" in their excited states at these sites for extended periods. Trapping sites may occur at many different energy levels, which can be characterized by the temperatures at which the traps are emptied by thermal effects. It should be noted that trapping sites are often referred to simply as "traps" and this term is also used to refer to such sites when they are associated with charge carriers in an excited state. Traps may also be redistributed or "photoconverted" from higher to lower energy levels by exposure to light radiation of appropriate wavelengths when the lower energy traps are stable as determined by the temperature of the thermoluminescent material. It is believed that this photoconversion process involves the absorption of light quanta by charge carriers at high energy traps through electric dipole transitions. These charge carriers are thereby raised into excited states of sufficient energy to be within the conduction band for the thermoluminescent material, and this allows them to become mobile and diffuse away from their original high energy trap sites. However, a large number of these charge carriers are subsequently recaptured by low energy traps when the temperature of the material is sufficiently low.

By cooling the thermoluminescent material, the stability of lower energy traps is ensured. Exposure to sufficient ultraviolet light in the range of 200–400 nm may then photoconvert many high energy traps into lower energy traps which would ordinarily not be stable because they correspond to temperatures below ambient temperature. These lower energy traps may then empty as the thermoluminescent material is subsequently heated thereby causing emission of light that can be detected and counted.

This method of operation is highly desirable since it allows a larger number of traps, including many higher energy traps, such as the known 658K trap in $CaF_2$:Mn, that are inaccessible under prior art TLD techniques to be used in reading out energy dosages.

It has been found that the technique of cooled optically stimulated luminescence (COSL) described with reference to FIG. 2 is not confined to the materials described in U.S. Pat. No. 4,954,707, and that the technique is also applicable to other materials having imperfections in their crystal structure. Further, the wavelength of the light used in optical stimulation of the cooled thermoluminescent material depends on the material and need not always be in the ultraviolet region.

A crystalline material in which vacancies exist at positions that should be occupied in the crystal structure by anions is referred to as being anion-defective. Alpha-$Al_2O_3$ may be rendered anion-defective by incorporating carbon in the material. It has been found that anion-defective alpha-$Al_2O_3$ material sold by Victoreen Inc. of 600 Cochran Road, Solon, Ohio under the designation 2600-80 has very sensitive COSL properties. When this material is exposed to ionizing radiation from a Cs-137 gamma source, cooled to liquid nitrogen temperature, exposed to blue light (442 nm) and then warmed to room temperature, a luminescence response that is extremely sensitive to dose is observed. Whereas luminescence measurements on $CaF_2$:Mn provide a sensitivity of around 40,000 counts per mR from a Cs-137 gamma source, the anion-defective alpha-$Al_2O_3$ has a sensitivity of around 200,000 counts per mR from the same source. This implies that a dosimeter employing anion-defective alpha-$Al_2O_3$ could be used to measure doses of below 10 uR.

The thermoluminescent material that is used in cooled optically stimulated luminescence must be cooled well below the temperature at which luminescence is observed on warm-up, but it is not necessary that the material be cooled to a particular temperature, such as the temperature of liquid nitrogen. Liquid nitrogen is selected for cooling purposes simply because its temperature is low enough to allow photoconversion of high temperature traps to stable low temperature traps in the materials that have been investigated.

When the anion-defective alpha-$Al_2O_3$ material that has been exposed to ionizing radiation, cooled to liquid nitrogen temperature and exposed to blue light is allowed to warm to room temperature, the luminescence response commences at a temperature of around 230K, which is substantially higher than the temperature at which $CaF_2$:Mn provides a luminescence response as previously described. It is therefore sufficient to cool anion-defective alpha-$Al_2O_3$ to a temperature well below 230K, for example about 200K, in order to achieve cooled optically stimulated luminescence. It is not necessary to use liquid nitrogen to cool to 200K, since that temperature is within the range that can be achieved with a Peltier effect cooler or a Sterling cycle refrigerator. Accordingly, it is not necessary to have a source of liquid nitrogen available in order to perform cooled optically stimulated luminescence with anion-defective alpha-$Al_2O_3$, and FIG. 3 illustrates a modified form of the apparatus shown in FIG. 1 in which the dewar flask 10 and the holding vessel 22 are replaced by a cooler or refrigerator, shown schematically at 52, connected to a source 54 of operating power.

It is desirable to be able to anneal a dosimeter so that it is restored to its former (pre-exposure) condition and can be reused. Currently, a standard technique for annealing a calcium fluoride detector doped with manganese impurity is heating at 673K for 15–20 minutes.

Figure 4:
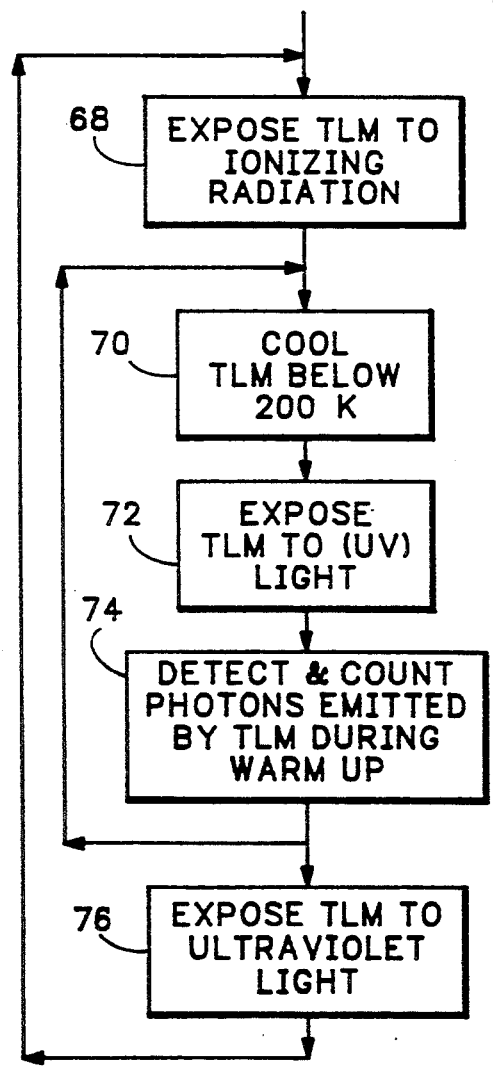
FIG. 4 is a flow diagram of the process steps of a modified form of the method illustrated in FIG. 2.

FIG. 4 illustrates an alternative annealing procedure. As shown at step 76 in FIG. 2, after readout the thermoluminescent material is exposed to ultraviolet light at room temperature. This can be done using the equipment shown in FIG. 1. The sample holding tray 34 containing a sample of thermoluminescent material is removed from the sample readout chamber 30 and is placed in the sample exposure chamber 20. The sample is at room temperature, and in chamber 20 it is exposed to ultraviolet light from the source 24. Exposure to ultraviolet light erases the residual radiation signal and thereby anneals the dosimeter. When annealing is complete, the sample can again be exposed to ionizing radiation. The extent to which thermoluminescent material must be annealed prior to re-use depends on the dose that is to be measured. In order to measure a small dose, the thermoluminescent material must be annealed so as to empty substantially all the traps, but if it is not necessary to have the capability to measure small doses of radiation, the material need not be annealed so thoroughly.

It is becoming increasingly apparent that exposure to ultraviolet radiation, such as in sunlight, can be a significant health hazard. It is, therefore, desirable that there should be a reliable and simple technique for measuring ultraviolet exposure.

Figure 5:
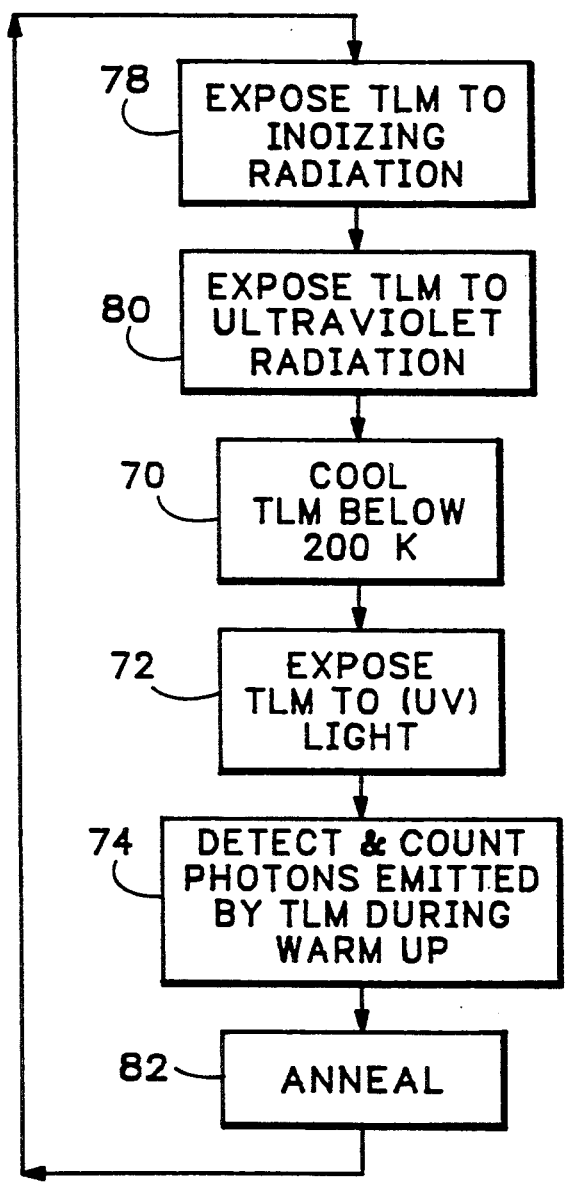
FIG. 5 is a flow diagram of the process steps of a method for measuring exposure to ultraviolet radiation.

FIG. 5 illustrates a technique for measuring exposure to ultraviolet radiation. As shown in FIG. 5, a dosimeter that comprises thermoluminescent material, such as a homogeneous body of polycrystalline $CaF_2$:Mn, is conditioned by exposing it to a known level of dose of ionizing radiation (step 78). Typically, the dose is on the order of 100 rad. The radiation must be sufficiently penetrating to provide a substantially uniform effect throughout the dosimeter. The radiation source might be, for example, high energy (1 Mev) beta radiation from Sr-90, 600 kev gamma radiation from Cs-137 or 1.2 Mev gamma radiation from Co-60. In this fashion, a radiation signal is stored in the dosimeter in the form of trapped charge carriers. The conditioned dosimeter is exposed to UV radiation (step 80). The exposure to UV radiation causes at least some of the trapped charge carriers to be released, and consequently the radiation signal stored in the dosimeter is at least partially removed or erased. The residual dose on the dosimeter is then detected by the method described with reference to FIG. 2. The difference between the initial dose and the residual dose is a function of the exposure to UV radiation. It has been found that with a detector that is about 0.89 mm thick, the minimum detectable level of UV dose was on the order of 0.3 mJ, comparable to solar exposure for one second on a clear day at the equator. With a detector that is about 0.15 mm thick, the minimum detectable level of dose was about 30 mJ, comparable to solar exposure for one minute on a clear day at the equator. After the residual dose has been measured, the dosimeter may be annealed (step 82) to prepare it for reuse.

It will be appreciated that the invention is not restricted to the particular embodiments that have been described, and that variations may be made therein without departing from the scope of the invention as defined in the appended claims and equivalents thereof.

We claim:

1. A method for detecting whether a thermoluminescent material has been exposed to ionizing radiation, comprising the steps of:
    (a) cooling the thermoluminescent material down to a temperature substantially below that at which the material exhibits a luminescence response on warming after exposure to light radiation,
    (b) exposing the thermoluminescent material to light radiation in order to photoconvert high temperature traps to low temperature traps, and
    (c) detecting light radiation released by the thermoluminescent material as it is allowed to warm.

2. A method according to claim 1, wherein step (b) comprises exposing the thermoluminescent material to ultraviolet light radiation.

3. A method according to claim 1, wherein the thermoluminescent material that is cooled, exposed to light radiation and allowed to warm is anion-defective alpha-$Al_2O_3$.

4. A method according to claim 1, wherein the thermoluminescent material that is cooled, exposed to light radiation and allowed to warm is anion-defective alpha-$Al_2O_3$, and step (b) comprises exposing the material to blue light.

5. A method according to claim 1, wherein the thermoluminescent material that is cooled, exposed to light radiation and allowed to warm is anion-defective alpha-$Al_2O_3$, step (a) comprises cooling the material down to a temperature of about 200K, and step (b) comprises exposing the material to blue light.

6. A method according to claim 1, further comprising repeating steps (a), (b) and (c).

7. A method according to claim 1, further comprising:
    (d) exposing the thermoluminescent material to light radiation in order to anneal the thermoluminescent material.

8. A method according to claim 7, further comprising:
    exposing the thermoluminescent material to ionizing radiation and repeating steps (a), (b) and (c).

9. A method according to claim 1, comprising measuring the dosage of ionizing radiation to which the thermoluminescent material has been exposed by counting the light released by the thermoluminescent material as it is allowed to warm.

10. An apparatus for detecting whether a solid state thermoluminescent dosimeter had been exposed to ionizing radiation, comprising:
    cooling means for cooling the dosimeter to a predetermined temperature substantially below that at which the dosimeter provides a luminescence response on warming after exposure to light radiation;
    illumination means for exposing the dosimeter to light radiation in order to photoconvert high temperature traps into low temperature traps; and
    means for detecting light emitted by the dosimeter as it is allowed to warm.

11. An apparatus according to claim 10, further comprising:
    means for counting light emitted by the dosimeter as it is allowed to warm.

12. Dosimeter apparatus for detecting exposure to radiation, comprising:
    a solid state thermoluminescent dosimeter;
    cooling means for cooling the dosimeter to a predetermined temperature substantially below that at which the dosimeter provides a luminescence response on warming after exposure to light radiation;
    illumination means for exposing the dosimeter to light radiation in order to photoconvert high temperature traps into low temperature traps; and
    means for detecting light emitted by the dosimeter as it is allowed to warm.

13. Apparatus according to claim 12, wherein the dosimeter comprises a body of anion-defective alpha-$Al_2O_3$, the cooling means are operative to cool the dosimeter to a temperature of about 200K, and the illumination means are operative to expose the dosimeter to blue light.

14. A method of detecting exposure to ultraviolet light, comprising:
    (a) irradiating a thermoluminescent material with a predetermined dose of ionizing radiation, whereby a radiation signal is recorded in the thermoluminescent material,
    (b) exposing the thermoluminescent material to ultraviolet radiation, whereby the radiation signal is at least partially removed, and
    (c) detecting the residual radiation signal by cooling the thermoluminescent material to a predetermined temperature, exposing the thermoluminescent material to light radiation in order to photoconvert high temperature traps into low temperature traps, and detecting light released by the thermoluminescent material as it is allowed to warm.

15. A method according to claim 14, further comprising counting light released by the thermoluminescent material as it is allowed to warm.

16. A method for detecting exposure to ionizing radiation, comprising:
    cooling a body of material containing anion-defective alpha-$Al_2O_3$ to a predetermined temperature,
    exposing said body to light radiation in order to photoconvert high temperature traps into low temperature traps, and
    detecting light released by said body as it is allowed to warm.

17. A method according to claim 16, further comprising counting said light released by said body.

* * * * *